United States Patent [19]

Edwards et al.

[11] Patent Number: 4,953,593

[45] Date of Patent: Sep. 4, 1990

[54] FLUID MIXING APPARATUS FOR PRODUCING VARIABLY CARBONATED WATER

[76] Inventors: William A. Edwards, P.O. Box 685, LaVernia, Tex. 78121; Samuel Durham, 3539 Oakhorn, San Antonio, Tex. 78247

[21] Appl. No.: 359,223

[22] Filed: May 31, 1989

[51] Int. Cl.$^5$ ............ F16K 15/04; F16K 47/08
[52] U.S. Cl. ................ 137/606; 137/614.2; 251/205
[58] Field of Search ............ 137/606, 614.2; 251/205

[56] References Cited

U.S. PATENT DOCUMENTS

| | | | |
|---|---|---|---|
| 2,279,513 | 4/1942 | Hage | 137/614.2 |
| 2,546,258 | 3/1951 | Farrell | 137/614.2 |
| 3,599,668 | 8/1971 | Ricardi | 137/606 |
| 4,217,931 | 8/1980 | Jackel | 137/606 |
| 4,821,925 | 4/1989 | Wiley et al. | 137/606 |

Primary Examiner—John Rivell
Assistant Examiner—L. R. Leo
Attorney, Agent, or Firm—Cox & Smith Incorporated

[57] ABSTRACT

A variable output adjustable carbonator for blending plain and carbonated water at a desired ratio before being mixed with syrup inside the nozzle of a beverage dispenser. The dilution of carbonated water with plain water permits the dispensing of beverages having variable carbonation. Plain and carbonated water traveling in separate conduits enter the adjustable carbonator and follow separate passages inside, each being regulated by an adjustable flow control washer which maintains a constant flow therethrough despite variations in the fluid supply pressure. A needle valve is employed to adjustably restrict flow through each flow control washers, thereby fixing the mixture of plain and carbonated water at a predetermined ratio.

8 Claims, 2 Drawing Sheets

FLUID MIXING APPARATUS FOR PRODUCING VARIABLY CARBONATED WATER

BACKGROUND OF THE INVENTION

This invention relates to an apparatus for controlling the carbonation of beverages obtained from drink dispensing machines. Beverages are formed in a beverage dispenser by mixing carbonated water from a single source with the syrup of the different brands. Most standard soft-drink brands require a carbonator producing carbonated water with a concentration of carbon dioxide higher than that required for fruit juice based beverages. These low carbonation brands must be supplied with their own carbonators or else use the stronger carbonator of the standard brands. Similarly, the standard carbonator itself must be replaced where local tastes favor a lower degree of carbonation in all beverages.

While the need for a means of controlling the degree of carbonation in beverage dispensers to accommodate different beverages and tastes is significant, prior beverage dispensers are unable to perform this function. The beverage dispensers commonly found in public restaurants, cafeterias, snack bars, etc., generally mix carbonated water from a single source with a different brand of syrup inside the nozzle of each dispenser head. See, for example, U.S. Pat. No. 3,892,335, issued to Alfred A. Schroeder, on July 1, 1975. Basically, the syrup and carbonated water lines emanate from sources exterior to the dispenser and are cooled in the interior prior to terminating in the nozzle. A separate line is dedicated for each of the different brand syrups while a single carbonated water line is split by couplings to connect to each one of the dispenser heads. Thus, whatever level of carbonation is chosen, it is applied uniformly to all of the different dispensed beverages. There exists a need, therefore, for a beverage dispenser permitting the carbonation levels of the carbonated water supplied for each beverage to be individually adjusted.

Accordingly, it is an object of the present invention to provide an apparatus for supplying carbonated water to a beverage dispenser mixing nozzle at an adjusted carbonation level.

SUMMARY OF THE INVENTION

The present invention is a blending apparatus which proportionally mixes carbonated and plain water supplied in separate conduits from separate supply sources. The plain and carbonated water are mixed at a preset ratio according to the setting of two needle valves which control the flow of the carbonated and plain water into a mixing chamber. From the mixing chamber, the mixture of the carbonated and plain water exits the apparatus so that it may be combined with syrup to form a beverage.

Each of the needle valves includes a needle and a flow control washer in adjustable relationship in order to restrict the flow through the washer. The flow control washers are further adapted to maintain a relatively constant flow even as the supply pressures of the carbonated and plain water sources vary. Thus, the apparatus also maintains the desired constant mixing ratio even as the supply pressures vary.

Many other objects, features and advantages of the present invention will be obvious from the following more detailed descriptions, especially when considered in conjunction with the attached drawings and the appended claims.

DESCRIPTION OF THE PREFERRED EMBODIMENT

Figure 1:
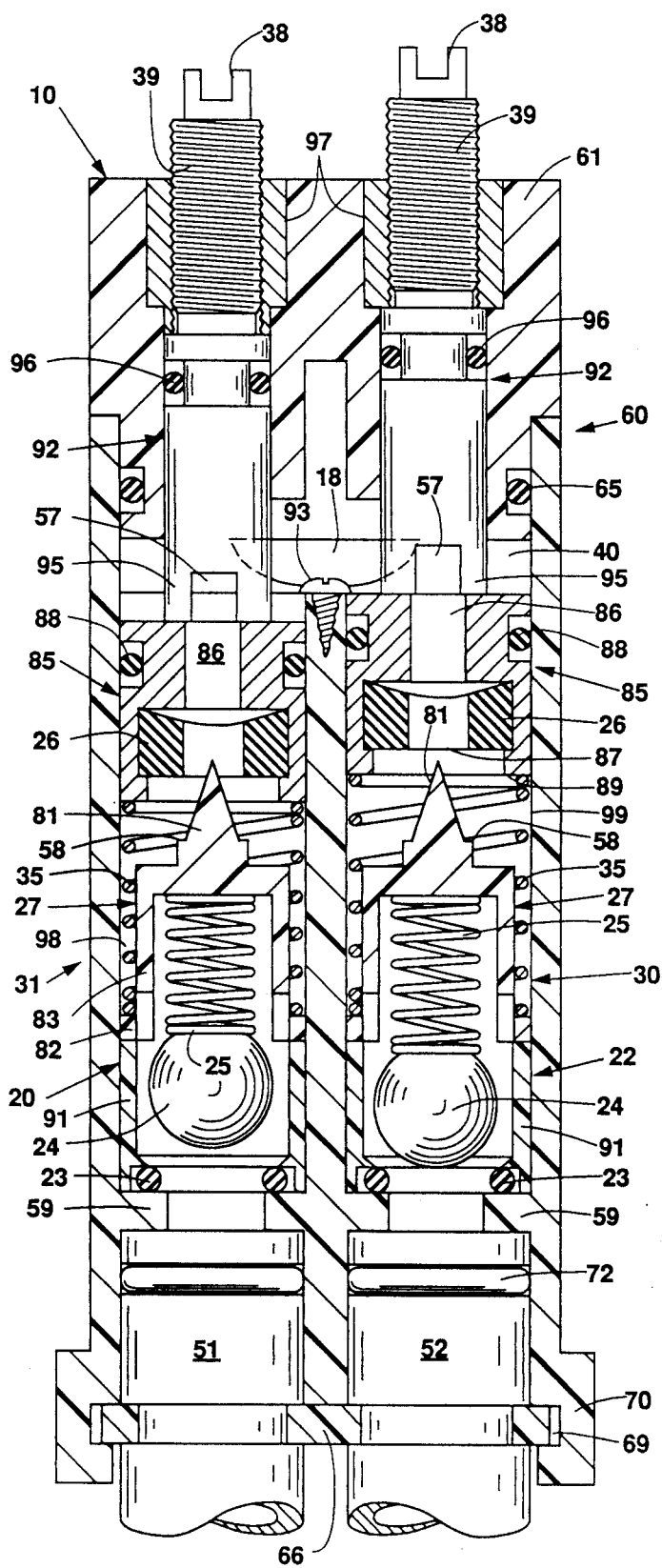
FIG. 1 is a cross-sectional view of the adjustable carbonator centrally cross-sectioning the inlet passages of plain and carbonated water.

Referring to FIG. 1, there is shown a detailed sectional view of a preferred embodiment of the present invention, referred to as adjustable carbonator 10. Adjustable carbonator 10 basically defines two fluid passages —first inlet passage 20 and second inlet passage 30 for regulating the flow of plain drinking water and the flow of carbonated water, respectively, to a common mixing chamber 40. Each of the inlet passages 20 and 30 is basically defined as a cylindrical bore 98 and 99, respectively, through a composite housing 60. Bore 98 is parallel to bore 99, and each contains a check valve 22 and an adjustable needle valve 31 for regulating the flow therethrough. The first inlet passage 20 is identical to the second inlet passage 30, but each of the passages 20 and 30 are separately adjustable.

Likewise, there are two input lines 51 and 52 feeding into the adjustable carbonator. Line 51 is connected to inlet passage 20 and carries plain drinking water from a suitable source of water. In the present embodiment, the suitable source of water is the outlet of a carbonator pump. Line 52 is connected to inlet passage 30 and carries carbonated water from a carbonator tank. Streams of plain and carbonated water thus flow into the adjustable carbonator through separate inlet passages 20 and 30, respectively.

For purposes of this description, because inlet passages 20 and 30 and the components associated therewith are identical, like reference numerals are used to reference many of the identical components and features of each of inlet passages 20 and 30.

The check valve 22 in each inlet passage 20, 30 comprises a stainless steel ball 24 which is spring-biased against an O-ring 23 as a means for preventing backflow in the respective passage. O-ring 23 is fixed in place between an inwardly protruding flange 59, which is integral with housing 60, and an inwardly protruding flange 94, which is integral with an annularly cylindrical member 91. Annularly cylindrical member 91 fits snugly and concentrically within the bore 98, 99 of the respective inlet passage and contains ball 24 in the central space thereof. Spring 25 is engaged in compression between needle 27 and ball 24 as a means for biasing ball 24 toward its seated position in O-ring 23. The spring constant of spring 25 is significantly less than that of outer spring 35 (described further herein) so that when operating under positive flow toward mixing chamber 40, the hydrodynamic forces acting on ball 24 compress spring 25 without further compressing outer spring 35. Hence, needle 27 remains stationary during operation while the positive flow through the respective inlet passage opens check valve 22 by pushing ball 24 toward needle 27. FIG. 1 depicts the check valve 22 of each inlet passage 20, 30 in an open position such that the ball 24 is displaced toward mixing chamber 40. When flow is absent, the ball 24 is seated firmly against O-ring 23 or some other seating orifice to prevent any backflow through the inlet passage.

From check valve 22, flow through the respective inlet passage 20, 30 is directed toward mixing chamber 40 through an adjustable needle valve 31 which regulates the flow. Needle valve 31 particularly comprises a needle 27, a washer 26 and means for adjusting the size of the opening therebetween. Needle 27 has a conical member 81 and an annular member 82. The conical member 81 is centrally disposed in the respective inlet passage 20, 30 while the annular member slidably engages the surface of the respective bore through housing 60. A ribbed cage 83, which is an integral part of needle 27, fixedly positions the conical member 81 relative to the annular member 82. The ribbed cage 83 (shown in more detail in FIG. 2) has various openings for allowing flow to pass through needle 27. Ribbed cage 83 also defines a cylindrical space central thereto for containing spring 25 therein.

The flow control washer 26 of needle valve 31 is assembled in a piston-like assembly 85 having a central bore 86 therethrough. The assembly 85 is generally cylindrical and is axially slidable within the bore 98, 99 of the respective inlet passage 20, 30. The assembly 85 also comprises an O-ring 88 there-around for ensuring its performance. The assembly 85 is biased away from needle 27 by an outer spring 35 which is compressed between a circumferential flange 89 of assembly 85 and the annular portion 82 of needle 27. The lower surface of needle 27, in turn, bears against the upper surface of the annular member 91 defining the socket of check valve 22. Movement of assembly 85 in the downstream direction (upward in FIG. 1) is limited by the lower of plunger 92 or head 93. Head 93 is the head of a screw 100 (shown in FIG. 2) which is screwed into and fixed relative to housing 60.

The flow control washer 26 of assembly 85 ensures constant flow through each inlet passage despite varying flow pressure since, as pressure increases, the size of the orifice therethrough inherently becomes smaller. Such flow control washers are manufactured by Vernay Laboratories of Yellow Springs, Ohio. The concave portion of washer 26, which is characteristic of flow control washers, must be faced in the downstream direction and, for optimum performance, the conical member 81 of needle 27 should be positioned on the upstream side of washer 26.

Plunger 92 provides a means for adjusting the size of the opening between washer 26 and the conical portion of needle 27 to effectuate corresponding adjustment of the rate of flow through needle valve 31. Plunger 92 is an axial member having a threaded portion 39 which is threadably engaged with a threaded insert 97 that is rigidly connected to housing 60. The lower extremity of plunger 92 bears rotatably against the upper surface of the respective assembly 85 to oppose the force exerted by outer spring 35 and thereby set the position of assembly 85 relative to needle 27. The lower extremity of plunger 92 is provided with two diametrically oriented notches that are orthogonal relative to one another to create a hollow end with four radial openings 57 spaced around its circumference to allow flow through the central bore 86 of assembly 85 to enter mixing chamber 40. The upper end of plunger 92 is provided with a notch 38 for receiving the blade of a screw driver to enable adjustment of the position of plunger 92. Plunger 92 is coaxial with assembly 85 and has a larger outer diameter than the diameter of bore 86. An O-ring 96 is provided around plunger 92 to prevent leakage from mixing chamber 40.

Thus, each of inlet passages 20 and 30 conduct positive flow from the respective lines 51 or 52 to mixing chamber 40 while regulating the rate of that flow due to the inherent characteristics of the respective washer 26 and due to the position of washer 26 relative to the respective needle 27. To adjust the rate of flow through either of the inlet passages 20 or 30, the respective washer assembly 85 is raised or lowered relative to the respective needle 27. Raising or lowering of the washer assembly 85 is achieved simply by inserting a screw driver in the end notch 38 of threaded portion 39 and turning the threaded portion 39 in the appropriate direction. If assembly 85 is lowered in that manner to the greatest extent possible, washer 26 sealingly engages a circumferential ledge 58 on the surface of conical portion 81 to completely cut off flow through the respective inlet passage. Ledge 58 enables such closure while preventing the conical portion 81 from being wedged in the orifice of washer 26. When plunger 92 is raised to its uppermost position, such as is shown with respect to inlet passage 30, the upper surface of assembly 85 bears against head 93 and is coplanar with the lower surface of mixing chamber 40. In that position, the needle valve 31 enables maximum flow therethrough.

Once the carbonation level has been selected for a specific brand or type of beverage, the washer 26 can be adjusted to the appropriate position by appropriately turning portions 39. For example, where a low degree carbonation is desired, the needle valve 31 in inlet passage 20 could be opened by turning portion 39 to raise the flow control washer 26 relative to the needle 27 to allow a larger flow of plain water. Conversely, the needle valve 31 of the other inlet passage 30 could be partially closed to restrict the flow of carbonated water and thereby achieve a similar end. The plain and carbonated water then enter the mixing chamber 40 and the resulting mixture will have a degree of carbonation depending on the ratio of the two flows. By adjusting each of the needle valves 31, the adjustable carbonator 10 can produce a range of water mixtures varying between totally uncarbonated water to carbonated to the extent of the water in line 52. Further, because the flow control washers 26 maintain a constant flow even as supply pressure varies, the desired mixing ratio is ensured despite pressure fluctuations in lines 51 and 52.

Figure 2:
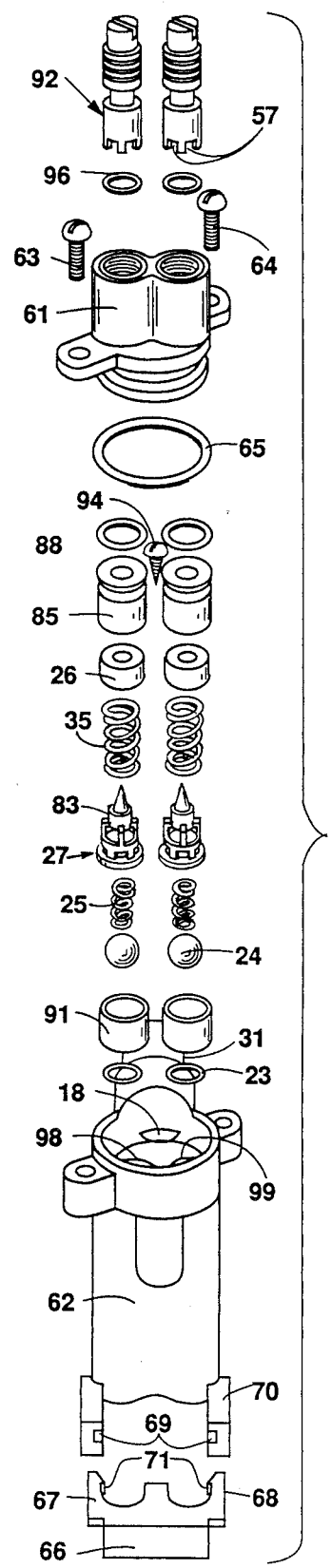
FIG. 2 is an exploded view of the adjustable carbonator.

As shown in FIG. 2, housing 60 itself is formed of an upper member 61 and a lower member 62 which are connected together by means of screws 63 and 64 to define mixing chamber 40 (shown in FIG. 1) therebetween. An O-ring 65 is provided in a circumferential groove of upper member 61 to prevent leakage from mixing chamber 40. Once lines 51 and 52 have been properly inserted at the lower end of the respective passages 20 and 30, a clip 66 is inserted in a direction perpendicular thereto to secure the lines 51 and 52 in place. The lateral extremities 67 and 68 of clip 66 are slidably received in the groove 69 of a connector 70 and the clip is slid to a position which engages lines 51 and 52 so that they cannot be removed. The jaws 71 of clip 66 prevent its removal once it has engaged the lines 51 and 52, and O-ring 72 (shown in FIG. 1) provide a seal for such connection. A somewhat similar clip and connector may be provided on the outlet passage of adjustable carbonator 10 to facilitate connection with the lines of a beverage dispenser.

The mixing chamber 40, itself, is a disc-shaped chamber defined between members 61 and 62 wherein plain water from inlet passage 20 is mixed with carbonated water from inlet passage 30. The mixture of plain and carbonated water leaves the mixing chamber 40 through an outlet 18. Outlet 18 is located equidistant from the inlets of the two input passages 20 and 30 to ensure that adequate mixing of the plain and carbonated water streams takes place in the mixing chamber 40 before the fluid exits the adjustable carbonator. A circular conduit 31 (shown in FIG. 2) carries the carbonated water mixture from the adjustable carbonator.

Figure 3:
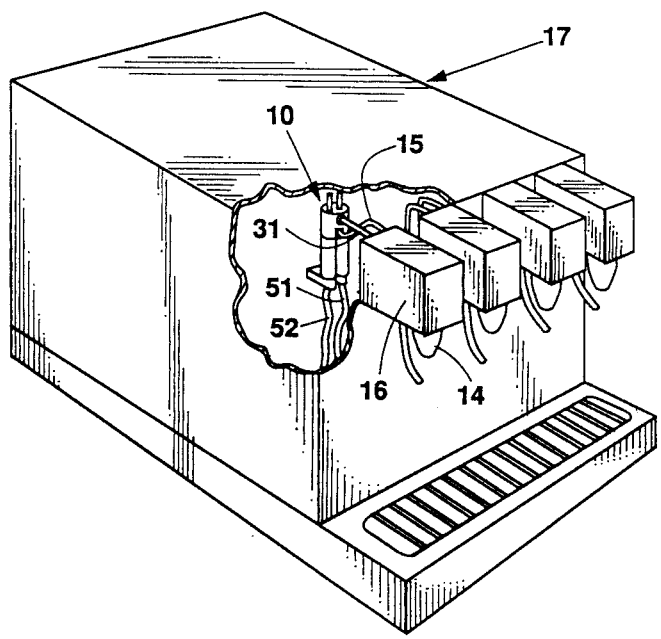
FIG. 3 is a pictorial view of a beverage dispenser displaying a possible location of the present invention and relevant connections.

Referring to FIG. 3, there is shown a perspective view of a beverage dispenser 17 with the adjustable carbonator 10 utilized to provide carbonated water of variable carbonation to a dispenser head 16 of the beverage dispenser 17. Each of the dispenser heads of beverage dispenser 17, including dispenser head 16, has a syrup line and a carbonated water line directed thereto for mixing and subsequent dispensing through a nozzle in a conventional fashion. In the illustration, a plain water line 51 and carbonated water line 52, which are fed by external sources, connect to the adjustable carbonator 10 from below. The carbonated water diluted in the adjustable carbonator leaves via conduit 31 towards the dispensing head 16 where it mixes with a beverage syrup carried by conduit 15 and is dispensed through nozzle 14. In the preferred embodiment shown in FIG. 3, only one of the dispenser heads, namely dispenser head 16, is provided with an adjustable carbonator 10, but other alternatives will be obvious. For instance, one adjustable carbonator could be used to produce adjustably carbonated water for all the dispenser heads of the beverage dispenser 17. In another alternate embodiment, a separate adjustable carbonator according to the present invention could be provided for each dispensing head. This allows the level of carbonation for each beverage to be individually adjusted.

Although the invention has been described in conjunction with the foregoing specific embodiment, many alternatives, variations and modifications will be apparent to those of ordinary skill in the art. Those alternatives, variations and modifications are intended to fall within the spirit and scope of the appended claims.

What is claimed is:

1. An adjustable carbonator for producing carbonated water with a variable carbonation level, comprising:
   a housing defining:
   a mixing chamber for receiving streams of plain and carbonated water,
   a first inlet passage for conveying plain water to said mixing chamber,
   a second inlet passage for conveying carbonated water to said mixing chamber, and
   an outlet for conveying carbonated water from said mixing chamber; and
   an inlet valve within at least one of said first and second inlet passages for adjustably controlling the flow therethrough, said inlet valve comprising:
   a pressure responsive flow control washer having an orifice which maintains a relatively constant flow therethrough despite variations in flow pressure.
   a needle valve for restricting the flow through the orifice of said flow control washer, and
   a means for adjusting the proximal relationship between said washer and said needle valve to adjust the degree to which said needle valve restricts the flow through the orifice of said washer.

2. The adjustable carbonator of claim 1 wherein said adjusting means comprises a threaded member for adjusting the position of said washer relative to said needle.

3. The adjustable carbonator of claim 4 wherein an outlet of each of said inlet passages is located equidistant from said outlet within said mixing chamber.

4. The adjustable carbonator of claim 1 further comprising a check valve within each inlet passage for preventing backflow.

5. The adjustable carbonator of claim 4 wherein said check valve comprises a ball biased by a spring to sealingly seat against a sealing means which prevents flow through said inlet passage when forward flow pressure is insufficient to unseat the ball.

6. The adjustable carbonator of claim 5 wherein said needle is positioned on the upstream side of said flow control washer.

7. The adjustable carbonator of claim 6 wherein said check valve is positioned upstream of said needle.

8. The adjustable carbonator of claim 5 wherein:
   said washer is assembled in a washer assembly;
   said adjusting means comprises a plunger which coaxially engages said washer assembly; and further comprising:
   a second spring engaged in compression between said housing and said washer assembly to bias said washer assembly toward said plunger.

* * * * *